(12) United States Patent
Buesser

(10) Patent No.: US 8,698,213 B2
(45) Date of Patent: Apr. 15, 2014

(54) PRESSURE-SENSITIVE AMPLIFIER STAGE

(75) Inventor: Wolfgang Buesser, Hargesheim (DE)

(73) Assignee: ELMOS Semiconductor AG, Dortmund (DE)

( * ) Notice: Subject to any disclaimer, the term of this patent is extended or adjusted under 35 U.S.C. 154(b) by 242 days.

(21) Appl. No.: 13/367,789

(22) Filed: Feb. 7, 2012

(65) Prior Publication Data

US 2012/0198946 A1    Aug. 9, 2012

(30) Foreign Application Priority Data

Feb. 7, 2011    (EP) ..................................... 11153549

(51) Int. Cl.
*G01L 1/00*    (2006.01)

(52) U.S. Cl.
USPC ....................................... 257/254; 73/862.68

(58) Field of Classification Search
None
See application file for complete search history.

(56) References Cited

U.S. PATENT DOCUMENTS

| 4,275,406 A | 6/1981 | Mueller |
| 4,459,856 A | 7/1984 | Ko |
| 4,522,072 A | 6/1985 | Sulouff |
| 5,408,885 A | 4/1995 | Araki |
| 5,554,881 A | 9/1996 | Koyasu |

FOREIGN PATENT DOCUMENTS

| DE | 78 28 255 | 9/1978 |
| DE | 43 11 298 | 10/1993 |
| DE | 44 44 408 | 6/1995 |
| EP | 0006740 | 6/1979 |
| EP | 1 152 232 | 2/1999 |

*Primary Examiner* — Lisa Caputo
*Assistant Examiner* — Brandi N Hopkins
(74) *Attorney, Agent, or Firm* — Renner, Otto, Boisselle * Sklar, LLP

(57) ABSTRACT

Pressure-sensitive amplifier stage comprising four unipolar pressure-sensor transistors each including a piezoresistive current path. The pressure-sensor transistors are connected as a pressure-measuring bridge having two bridge legs each comprising first and second pressure-sensor transistors which are connected in series. Two unipolar control transistors each has a control terminal and a current path arranged between a further first and a further second terminal. The respective first and second terminals of the two control transistors are connected in pairs, and the control terminals each is connected to a node between the pressure-sensor transistors. The interconnected second terminals are connected to the control terminals of the second pressure-sensor transistors of the two bridge legs. The control terminals of the first pressure-sensor transistors are adapted for connection thereto of a respective operating input voltage, and a measurement output voltage is detectable between the pressure-sensor transistors.

15 Claims, 2 Drawing Sheets

PRESSURE-SENSITIVE AMPLIFIER STAGE

RELATED CROSS-REFERENCING

The present invention claims the priority of European Patent Application No. 11 153 549.8 filed on Feb. 7, 2011, the disclosure of which is incorporated herein by reference.

BACKGROUND OF THE INVENTION

1. Field of the Invention

The present invention relates to a pressure-sensitive amplifier stage comprising a modified Wheatstone bridge.

2. Description of the Prior Art

It is known to connect micromechanical pressure sensors in the manner of a Wheatstone bridge by connection of MOS transistors. Such bridge circuits are described e.g. in EP-A-0006740, EP-B-1 152 232 (DE-T-699 17 943), U.S. Pat. Nos. 4,275,406, 4,459,856, 4,522,072, DE-C-43 11 298, DE-A-44 44 808 and DE-U-78 28 255.

When using MOS transistors as pressure sensors in micromechanical sensors, it is usually necessary to combine the output signals of a plurality of such pressure sensors connected in the manner of a Wheatstone bridge, e.g. in order to reduce or suppress the influences of casing-related mechanical tension onto the measurement amount. For this purpose, the individual pressure sensors connected in the manner of a Wheatstone bridge are usually connected in a combination of row circuits and parallel circuits. This combination of the output signals of a plurality of Wheatstone bridges is effected in that, depending on the desired polarity, bridges will be switched into a parallel or antiparallel configuration. These arrangements have the disadvantage that the total useful signal of the combination of the plurality of said Wheatstone bridges is not stronger than the useful signal of an individual pressure sensor or an individual Wheatstone bridge. Thus, in other words, there occurs an averaging of the signal strengths and not an addition, while the latter would be desirable.

It is an object of the invention to provide a pressure-sensitive amplifier stage which is cascadable.

SUMMARY OF THE INVENTION

To achieve the above object, the invention provides a cascadable pressure-sensitive amplifier stage comprising
- four unipolar pressure-sensor transistors, each comprising a control terminal and a current path arranged between a further first and a further second terminal, said current path being sensitive to mechanical tension (also referred to as mechanical stress),
- said four pressure-sensor transistors being connected as a pressure-measuring bridge having two bridge legs, each of said bridge legs comprising a first and a second pressure-sensor transistor which are connected in series with respect to their current paths,
- two unipolar control transistors, each having a control terminal and a current path arranged between a further first and a further second terminal,
- the respective first and second terminals of said two control transistors being connected in pairs, and the control terminals of the control transistors each being connected to a node between the pressure-sensor transistors of the two bridge legs, and
- the interconnected second terminals of the two parallel-connected control transistors being connected to the control terminals of the second pressure-sensor transistors of the two bridge legs,
- a first power source connected between a first supply voltage (VDD) on the one hand, and the first terminals of the first pressure-sensor transistors of the two bridge legs and the interconnected first terminals of the control transistors on the other hand, said first power source being provided for generating a first current, and
- a second power source connected between a second supply voltage (VSS) on the one hand, and the interconnected second terminals of the control transistors and the control terminals of the second pressure-sensor transistors of the two bridge legs on the other hand, said second power source being provided for generating a second current,
- the control terminals of the first pressure-sensor transistors of the two bridge legs being adapted for connection thereto of a respective operating input voltage, and a measurement output voltage being detectable between the respective pressure-sensor transistors of the two bridge legs, and
- said measurement output voltage of the pressure-measuring bridge being connectable to the control terminals of the first pressure-sensor transistors of the two bridge legs of a further pressure-measuring bridge for cascading the pressure-measuring bridges.

As is the case in each normal Wheatstone bridge, also the a pressure-sensitive amplifier stage according to the invention comprises four pressure sensors realized in the form of unipolar pressure-sensor transistors. Thus, these transistors are field-effect transistors designed as PMOS-, NMOS- or JFET-transistors.

The pressure-sensor transistors according to the invention are sensitive to mechanical tension (distortion) (hereunder also referred to as pressure-sensitive) and be designed e.g. for piezoresistive or capacitive operation. Each of said transistors comprises a control terminal, as well as a further first and a further second terminal with a pressure-sensitive current path extending therebetween which is activated by application of an operating voltage to said control terminal. The four pressure sensors are connected as a pressure-measuring bridge having two bridge legs.

Between said two bridge legs, two unipolar control transistors are connected, each of them comprising a control terminal and a current path extending between a further first and a further second terminal. Said further first terminals of the two control transistors are connected to each other. Similarly, also said further second terminals of the two control transistors are connected to each other. The control terminals of the two control transistors are each connected to another one of the two nodes between the pressure-sensor transistors of the bridge legs. Thus, the two control transistors are controlled by the potentials at the nodes of the two bridge legs.

The interconnected second terminals of the two control transistors connected in parallel with respect to their current paths are connected to the control terminals of the second pressure-sensor transistors of the two bridge legs, while the interconnected first terminals of the two parallel-connected control transistors are connected to the interconnected first terminals of the two first pressure-sensor transistors of the bridge legs. The respectively interconnected ends of the bridge legs are connected to a first and resp. a second current source, each of said current sources in turn having a first and resp. a second supply voltage applied to it. From the first current source, for instance, the bridge circuit is supplied with a current which will be divided among the two bridge legs and the two parallel-connected control transistors. Downstream of the two control transistors and at the end of the two bridge legs, the currents will be discharged toward the second supply voltage and resp. to the second current source. If, now, an operating voltage is applied to the control terminals of the first pressure-sensor transistors of the two bridge legs, an output voltage, forming the measurement output voltage, can be sensed at the nodes of the two bridge legs. For cascading a plurality of the pressure-sensitive amplifier stages of the invention, this measurement output voltage can now be applied to the control terminals of the first pressure-sensor transistors of a further amplifier stage.

By the inventive concept of the circuitry comprising the Wheatstone measurement bridge having four pressure-sensor transistors and further comprising the two control transistors and the current sources in the above described arrangement, it is rendered possible that, in spite of the cascading, each pressure-sensitive amplifier stage is supplied with the same operating input voltage at the first pressure-sensor transistors of the measurement bridge. Thus, no weakening of the measurement signal will occur. In this manner, there is achieved an addition (and resp. subtraction) of the useful signals so that the measurement range can be widened and the signal/noise ratio can be improved.

According to an advantageous further embodiment of the invention, it is provided that the pressure-sensor transistors and the control transistors are scaled substantially identically and that the amount of the first current is substantially twice that of the second current. Thus, for instance, the current impressed by the first current source will be distributed in a uniform manner onto the two bridge legs and the two parallel-connected control transistors. Each bridge leg will then carry ¼ of the impressed current while the two parallel-connected control transistors will carry one half of the impressed current. Of course, the invention is not limited to such a scaling of the transistors. In case of a circuit element scaling different from the one mentioned above, the current generated by the first current source will then be distributed in a different manner. In correspondence thereto, the amount of the current generated by the second current source will then have to be adapted.

In a further advantageous embodiment of the invention, the ratio between the difference of the first and second currents and the second current is selected to correspond to the scaling of each of the first pressure-sensor transistors of the two bridge legs relative to each of the two control transistors.

Finally, for prevention or damping of the oscillation of the pressure measurement bridge, a capacitance can be connected between the control terminals of the second pressure-sensor transistors of the two bridge legs and the second supply voltage.

The pressure-sensitive amplifier stage of the invention comprises four transistors sensitive to mechanical tensions, namely the (pressure) sensor transistors and two non-pressure-sensitive transistors, i.e. the control transistors. The control transistors serve for maintaining a common-mode potential, which is to say that each cascaded pressure-sensitive amplifier stage is supplied with the same operating input voltage at the control terminals of the first pressure-sensor transistors of the bridge legs.

Suitably, said four pressure-sensor transistors are PMOS transistors. Also the two control transistors are suitably realized as PMOS transistors. The first current source, too, can be provided with a PMOS transistor while the second current source comprises an NMOS transistor. As to these two voltage sources, it can be generally noted that they comprise unipolar transistors of different polarities since one current source will impress a current into the bridge circuit and the other current source will receive the current drained from the bridge circuit.

The above term "pressure-sensor transistor" is to be understood as denoting a transistor whose controllable current path is sensitive to mechanical tensions as generated e.g. in case of hydraulic, hydrostatic, pneumatic or mechanical pressures acting on the transistor.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
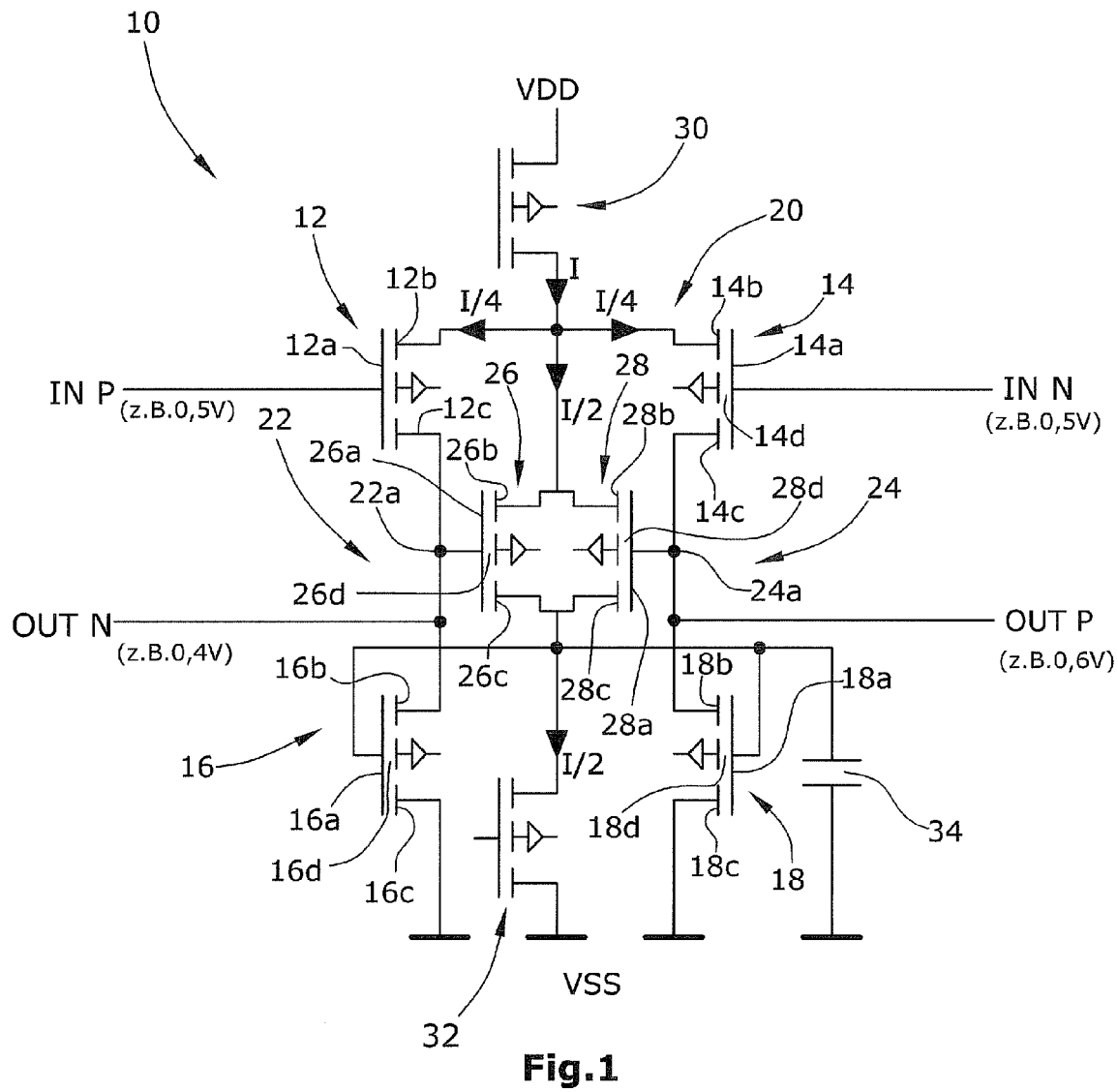
FIG. 1 shows the connection of an individual pressure-sensitive amplifier stage according to one embodiment of the invention.

In FIG. 1, the general configuration of a pressure-sensitive amplifier stage 10 is depicted. The pressure-sensitive amplifier stage 10 comprises four pressure-sensitive transistors (pressure-sensor transistors) 12, 14, 16, 18 which are connected in the manner of a Wheatstone bridge 20 having two bridge legs 22,24. Each pressure-sensor transistor 12, 14, 16, 18 comprises a control terminal 12a, 14a, 16a and resp. 18a as well as two further terminals 12b and 12c, 14b and 14c, 16b and 16c and resp. 18b and 18c, with a respective current path 12d, 14d, 16d and 18d extending therebetween which in the present embodiment is a piezoresistive current path. The four pressure-sensor transistors are designed e.g. as PMOS transistors. Connected between the nodes 22a, 24a of the two bridge legs 22,24 are two control transistors 26,28 whose non-pressure-sensitive current paths 26d, 28d are connected in parallel. The two control terminals 26a and 28a are connected to the nodes 22a,24a of a respective different bridge leg 22,24. The further first terminals 26b and 28b of the two control transistors 26 and 28 are connected to each other; likewise, the further second terminals 26c and 28c of the two control transistors 26 and 28 are connected to each other. The two first terminals 26b and 28b are additionally connected to the first further terminals 12b and 14b of the two first pressure-sensor transistors 12,14 of the bridge legs 22,24. The two further second terminals 26c and 28c of the control transistors 26 or 28 are connected to a respective different one of the two control terminals 16a,18a of the two second pressure sensors 16,18.

Between a supply potential VDD and the two first pressure-sensor transistors 12 and 14 of pressure-measuring bridge 20, a first current source 30 is connected for generating a current I, while the further second terminals 26c,28c of control transistors 26,28 have a further second current source 32 connected therebetween which is supplied by a second supply potential VSS. Further, pressure-measuring bridge 20 is connected via a capacitance 34 to the second supply potential, as shown in FIG. 1.

The two current sources 30,32 are realized e.g. again by MOSFET transistors of opposite conductive types.

The dimensioning of the current sources 30 and 32 and the scaling of the pressure-sensor transistors 12, 14, 16 and 18 and of the control transistors 26,28 is selected in such a manner that one half of the current I impressed by the first current source 30 will flow via the current paths 26d,28d of the control transistors while respectively ¼ of the current will flow via each of the two bridge legs 22,24. If, now, an operating input voltage INP and resp. INN (e.g. respectively 0.5 Volts) is applied to the control terminals 12a and 14a of the two first pressure-sensor transistors 12,14, a voltage will drop over the two first pressure-sensor transistors 12,14 also in dependence on the locally effective pressure, wherein the potential downstream of the two transistors is used, via the nodes 22a,24a, for controlling the two control transistors 26,28, notably in such a manner that, at the output OUTN and OUTP, there will be applied on average the same voltage again (e.g. 0.4 Volts at OUTN and 0.6 Volts at OUTP). Thus, on average, the output voltage is as large as the input voltage. The difference in the differential amount of the potentials at OUTN and OUTP in comparison to INP and INN is representative of the measured pressure and resp. the measured mechanical tensions which act on the pressure-measuring bridge 20.

Figure 2:
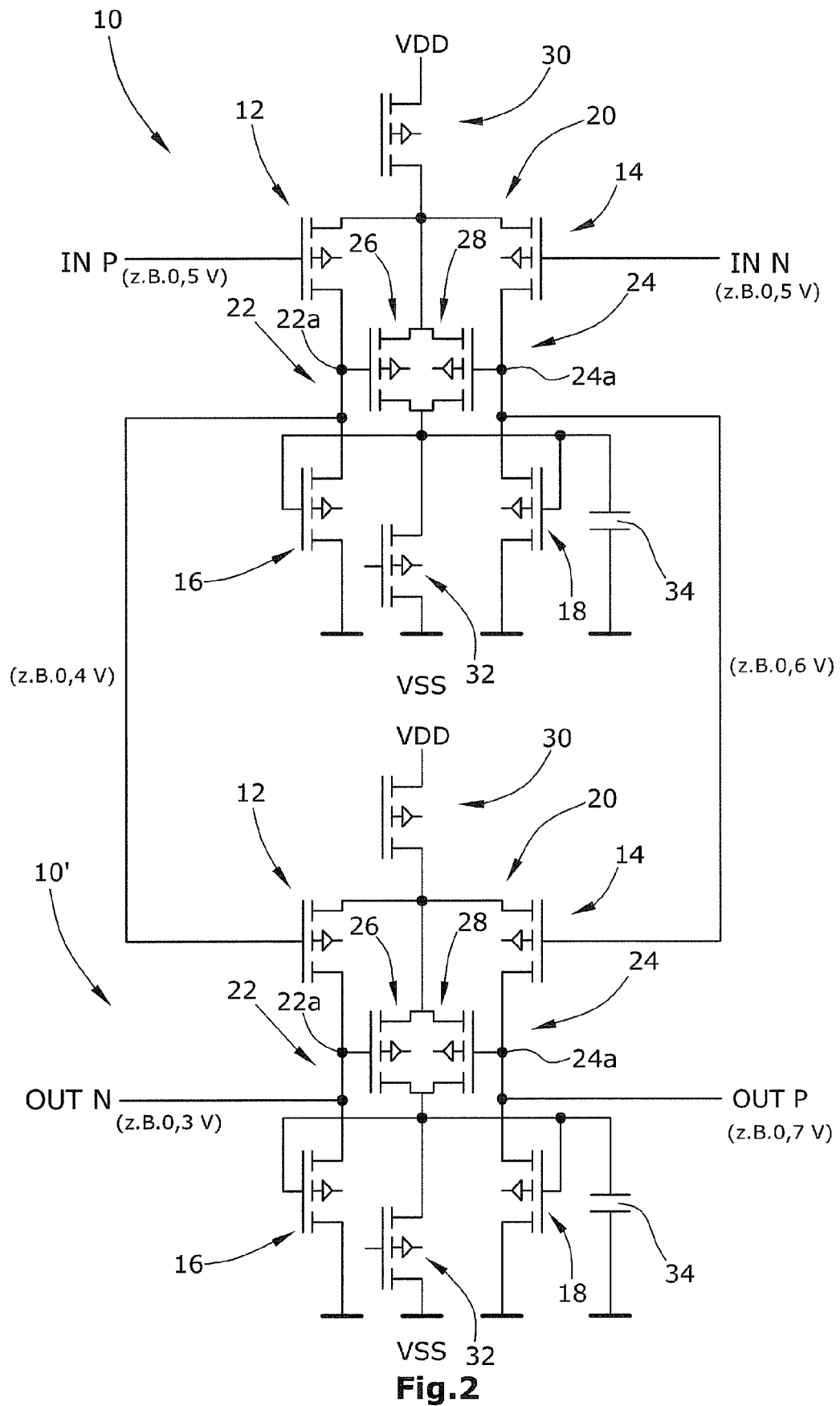
FIG. 2 shows the cascading of two pressure-sensitive amplifier stages according to FIG. 1 by serial connection of the two amplifier stages.

Thus, as explained above, the pressure-sensitive amplifier stage 10 carries an unchanged common-mode potential from its input (at INP and INN) to its output (OUTN and OUTP). This now makes it possible to cascade a plurality of amplifier stages 10 of FIG. 1 in the manner illustrated e.g. in FIG. 2. In FIG. 2, there is additionally shown an example of a possible further enlarged voltage difference at the output of the second amplifier stage 10' (OUTN being e.g. 0.3 Volts and OUTP being e.g. 0.7 Volts). Again, it is evident that the common-mode potential (average value of the voltages at OUTN and OUTP) has remained the same. The pressure-sensitive amplifier stage of the invention makes use of the pressure-sensor transistors 12, 14, 16 and 18 themselves for amplifying the useful signal so that the amplifier stages can be cascaded and the useful signals will add up. Further, the actual Wheatstone Bridge (pressure-measuring bridge 20) remains unchanged. Merely the control terminals 12a, 14a, 16a and 18a of the four pressure-sensor transistors 12, 14, 16 and 18 have to be wired in a different manner, and there have to be added several further, non-pressure-sensitive transistors, namely the two control transistors 26,28 (and, if using transistors for the current sources 30,32, also these transistors). The circuit of the invention has been explained above by way of an embodiment with reference to FIGS. 1 and 2. As to this embodiment, there is shown an assembly wherein the four pressure-sensor transistors 12, 14, 16 and 18, while having the same dimensioning, realize a differential amplification of one. The control transistors 26,28 together with the current sources 30,32 control the control terminals of the second pressure-sensor transistors 16,18 of the two bridge legs 22,24 in such a manner that the output common mode potential $(V_{OUTN}-V_{OUTP})/2$ corresponds to the input common mode potential $(V_{INN}+V_{INP})/2$. Thereby, different stages can be cascaded by connecting INN, INP to OUTN and OUTP and resp. to OUTP, OUTN while adding the pressure-dependent signals.

Depending on the respective use, the described combination of a plurality of cascaded pressure-sensitive amplifier stages 10 can serve e.g. as an input stage of a pressure-sensitive operational amplifier. By way of alternative, the combined signal can also be sensed at the last stage and resp. be supplied to an ADC (optionally after further intermediate amplification).

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

List of Reference Numerals 10 pressure-sensitive amplifier stage
10' cascaded amplifier stage
12 pressure-sensor transistor
12a control (gate) terminal of the pressure-sensor transistor
12b further (drain) terminal of the pressure-sensor transistor
12c further (source) terminal of the pressure-sensor transistor
12d current path of the pressure-sensor transistor
14 pressure-sensor transistor
14a control (gate) terminal of the pressure-sensor transistor
14b further (drain) terminal of the pressure-sensor transistor
14c further (source) terminal of the pressure-sensor transistor
16 pressure-sensor transistor
16a control (gate) terminal of the pressure-sensor transistor
16b further (drain) terminal of the pressure-sensor transistor
16c further (source) terminal of the pressure-sensor transistor
16d current path of the pressure-sensor transistor
18 pressure-sensor transistor
18a control (gate) terminal of the pressure-sensor transistor
18b further (drain) terminal of the pressure-sensor transistor
18c further (source) terminal of the pressure-sensor transistor
18d current path of the pressure-sensor transistor
20 pressure measurement bridge
22 bridge leg of the pressure measurement bridge
22a node in the bridge leg
24 bridge leg of the pressure measurement bridge
24a nodes in the bridge leg
26 control transistor
26a control (gate) terminal of the control transistor
26b first (drain) terminal of the control transistor
26c second (source) terminal of the control transistor
26d current path of the control transistor
28 control transistor
28a control (gate) terminal of the control transistor
28b first (drain) terminal of the control transistor
28c second (source) terminal of the control transistor
28d current path of the control transistor
30 first current source
32 second current source
34 capacitance

The invention claimed is:

1. A pressure-sensitive amplifier stage comprising
four unipolar pressure-sensor transistors, each comprising a control terminal and a current path arranged between a further first and a further second terminal, said current path being sensitive to mechanical tension,
said four pressure-sensor transistors being connected as a pressure-measuring bridge having two bridge legs, each of said bridge legs comprising a first and a second pressure-sensor transistor which are connected in series with respect to their current paths,
two unipolar control transistors, each having a control terminal and a current path arranged between a further first and a further second terminal,
the respective first and second terminals of said two control transistors being connected in pairs, and the control terminals of the control transistors each being connected to a node between the pressure-sensor transistors of the two bridge legs, and
the interconnected second terminals of the two parallel-connected control transistors being connected to the control terminals of the second pressure-sensor transistors of the two bridge legs,
a first power source connected between a first supply voltage on the one hand, and the first terminals of the first pressure-sensor transistors of the two bridge legs and the interconnected first terminals of the control transistors on the other hand, said first power source being provided for generating a first current, and a second power source connected between a second supply voltage on the one hand, and the interconnected second terminals of the control transistors and the control terminals of the second pressure-sensor transistors of the two bridge legs on the other hand, said second power source being provided for generating a second current, the control terminals of the first pressure-sensor transistors of the two bridge legs being adapted for connection thereto of a respective operating input voltage, and a measurement output voltage being detectable between the respective pressure-sensor transistors of the two bridge legs, and said measurement output voltage of the pressure-measuring bridge being connectable to the control terminals of the first pressure-sensor transistors of the two bridge legs of a further pressure-measuring bridge for cascading the pressure-measuring bridges.

2. The pressure-sensitive amplifier stage of claim 1, wherein the pressure-sensor transistors and the control transistors are substantially identically scaled and that the amount of the first current is substantially twice the amount of the second current.

3. The pressure-sensitive amplifier stage of claim 1, wherein the ratio between the difference of the first and second currents and the second current is selected to correspond to the scaling of each of the first pressure-sensor transistors of the two bridge legs relative to each of the two control transistors.

4. The pressure-sensitive amplifier stage of claim 3, wherein, for preventing or damping of the oscillation of the pressure measurement bridge, a capacitance is connected between the control terminals of the second pressure-sensor transistors of the two bridge legs and the second supply voltage.

5. The pressure-sensitive amplifier stage of claim 4, wherein the four pressure-sensor transistors are each designed as PMOS transistors.

6. The pressure-sensitive amplifier stage of claim 5, wherein the two control transistors are each designed as PMOS transistors.

7. The pressure-sensitive amplifier stage of claim 1, wherein, for preventing or damping of the oscillation of the pressure measurement bridge, a capacitance is connected between the control terminals of the second pressure-sensor transistors of the two bridge legs and the second supply voltage.

8. The pressure-sensitive amplifier stage of claim 2, wherein, for preventing or damping of the oscillation of the pressure measurement bridge, a capacitance is connected between the control terminals of the second pressure-sensor transistors of the two bridge legs and the second supply voltage.

9. The pressure-sensitive amplifier stage of claim 3, wherein the four pressure-sensor transistors are each designed as PMOS transistors.

10. The pressure-sensitive amplifier stage of claim 2, wherein the four pressure-sensor transistors are each designed as PMOS transistors.

11. The pressure-sensitive amplifier stage of claim 1, wherein the four pressure-sensor transistors are each designed as PMOS transistors.

12. The pressure-sensitive amplifier stage of claim 4, wherein the two control transistors are each designed as PMOS transistors.

13. The pressure-sensitive amplifier stage of claim 3, wherein the two control transistors are each designed as PMOS transistors.

14. The pressure-sensitive amplifier stage of claim 2, wherein the two control transistors are each designed as PMOS transistors.

15. The pressure-sensitive amplifier stage of claim 1, wherein the two control transistors are each designed as PMOS transistors.

\* \* \* \* \*